United States Patent [19]

Johnston

[11] 4,204,849
[45] May 27, 1980

[54] DISCHARGE VALVE ASSEMBLY FOR MULTIPLE-STAGE DUST COLLECTOR

[75] Inventor: Gordon L. Johnston, Maple Grove, Minn.

[73] Assignee: Donaldson Company, Inc., Minneapolis, Minn.

[21] Appl. No.: 938,006

[22] Filed: Aug. 30, 1978

[51] Int. Cl.² ..................... B01D 46/48; B01D 50/00
[52] U.S. Cl. ......................... 55/310; 55/319; 55/325; 55/337; 55/432; 55/DIG. 3; 55/345; 175/206
[58] Field of Search ................. 55/310, 319, 325, 330, 55/337, 429, 432, DIG. 3, 345, 350; 15/347, 349, 352, 353; 251/305, 306; 175/66, 206, 209; 210/315, 533

[56] References Cited

U.S. PATENT DOCUMENTS

| | | | |
|---|---|---|---|
| 1,251,453 | 12/1917 | Spencer | 251/306 |
| 1,664,683 | 4/1928 | Hawley | 55/433 |
| 1,761,627 | 6/1930 | Hine | 209/144 |
| 2,804,169 | 8/1957 | Olah | 55/450 |
| 2,887,177 | 5/1959 | Mund et al. | 55/321 |
| 2,889,008 | 6/1959 | Copp et al. | 55/348 |
| 2,889,892 | 6/1959 | Schaub et al. | 55/432 |
| 2,991,043 | 7/1961 | Saar | 251/306 |
| 3,243,043 | 3/1966 | Thompson et al. | 210/84 |
| 3,291,443 | 12/1966 | Schulz et al. | 251/305 |
| 3,319,404 | 5/1967 | Lowther | 55/432 |
| 3,387,889 | 6/1968 | Ziemba et al. | 299/12 |
| 3,429,108 | 2/1969 | Larson | 55/432 |
| 3,498,461 | 3/1970 | Miller | 210/253 |
| 3,528,514 | 9/1970 | Sandvig | 175/49 |
| 3,603,001 | 9/1971 | Arnold et al. | 55/432 |
| 3,640,499 | 2/1972 | Jung | 251/305 |
| 3,695,012 | 10/1972 | Rolland | 55/337 |
| 3,753,548 | 8/1973 | Jong et al. | 251/305 |
| 3,816,982 | 6/1974 | Regnault | 55/337 |
| 3,885,932 | 5/1975 | Moore, Jr. et al. | 55/319 |
| 3,915,679 | 10/1975 | Roach et al. | 55/347 |
| 4,050,913 | 9/1977 | Roach | 55/457 |
| 4,099,937 | 7/1978 | Ufken et al. | 55/319 |

FOREIGN PATENT DOCUMENTS

| | | | |
|---|---|---|---|
| 213184 | 3/1957 | Australia | 251/305 |
| 191856 | 9/1957 | Austria | 209/144 |
| 464319 | 7/1975 | U.S.S.R. | |

OTHER PUBLICATIONS

Hussey, Michael, Valves and Air Locks for Industrial Dust Filter Systems, Filtration Separation, Sep./Oct. 1976, pp. 509–511.
Donaldson Operation Manual Series RDX00-4545 Roof Drill Dust Collector, 1975.

*Primary Examiner*—David L. Lacey
*Attorney, Agent, or Firm*—Merchant, Gould, Smith, Edell, Welter & Schmidt

[57] ABSTRACT

A discharge valve assembly for use in dust collection systems is disclosed. The valve assembly includes a conduit (160) and a rotatable valve member (162). A rod (192) is connected to the valve member (162). The conduit (160) is formed of an elastic material and has a generally circular cross section. The conduit (160) also has an inner diameter (164) in an unstretched condition. The valve member (162) has a generally circular cross section and an outer diameter (178) which is greater than the inner diameter (164). The rod (192) has an axis spaced from a line bisecting the valve member (162) and is connected to the valve member (162) for rotation of the valve member (162) between a closed and an open position. In one embodiment of the invention, a plurality of discharge valve assemblies are disposed below a number of dust separator mechanisms (60,92). A discharge valve assembly can also serve as a suction or vacuum breaking means (158) in a multiple-stage dust collector system.

18 Claims, 11 Drawing Figures

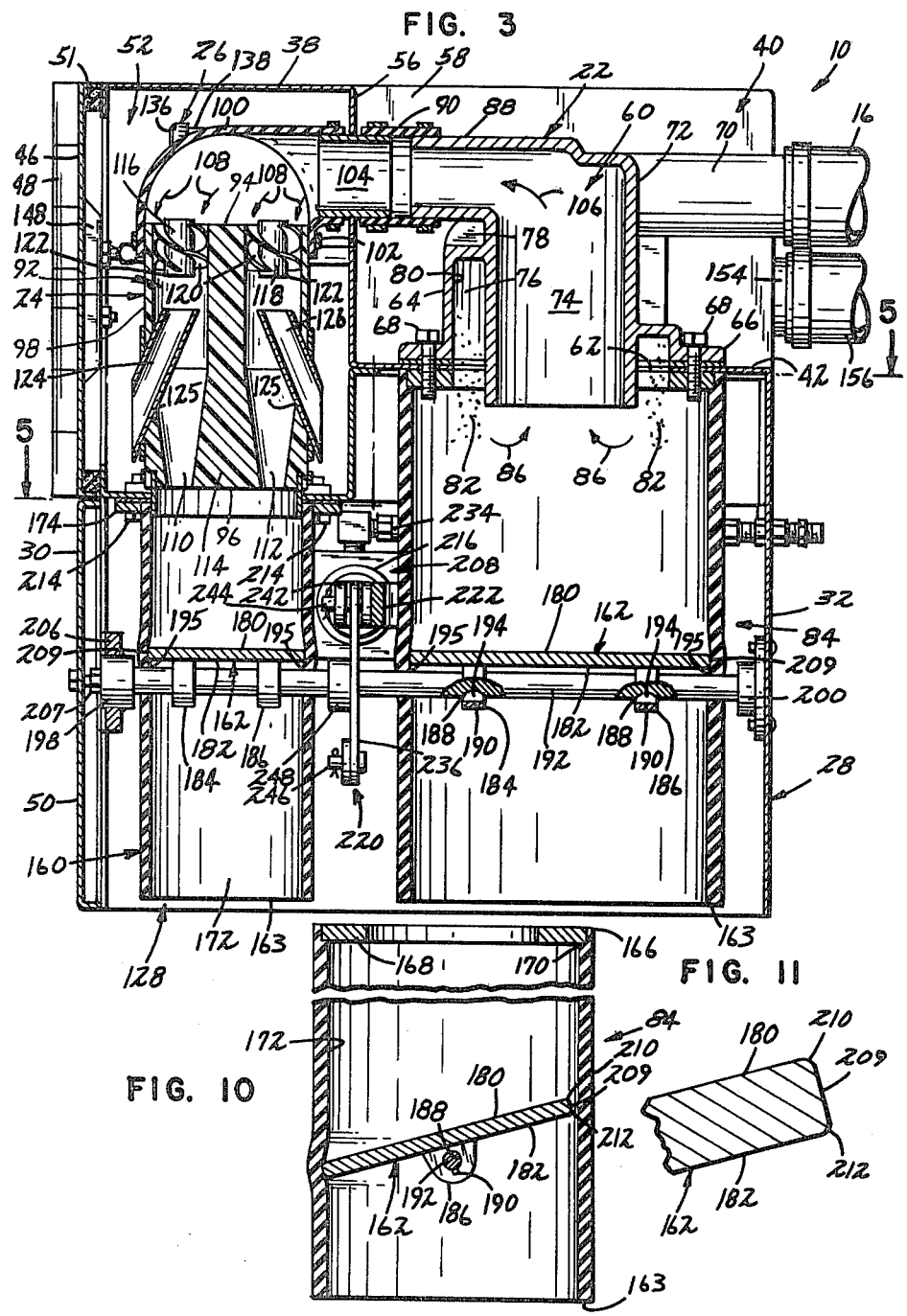

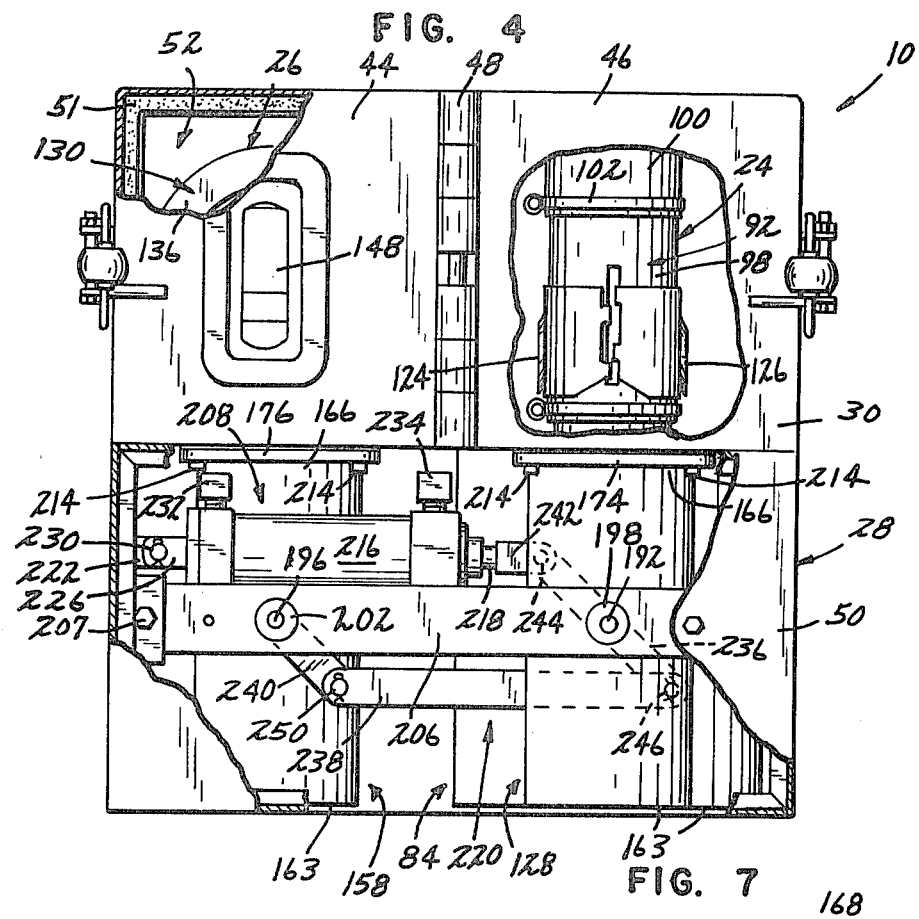
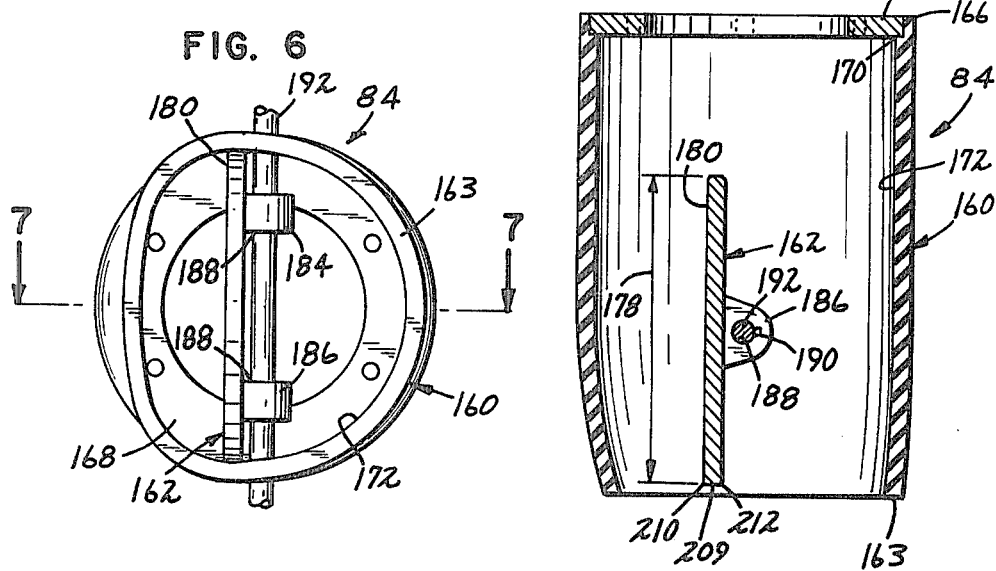

DISCHARGE VALVE ASSEMBLY FOR MULTIPLE-STAGE DUST COLLECTOR

TECHNICAL FIELD

The present invention relates broadly to a discharge valve assembly. More particularly, the invention relates to a discharge valve assembly for use in a multiple-stage dust collector, such as in a dust collector used in underground mine roof drilling operations.

BACKGROUND OF PRIOR ART

Numerous types of valve assemblies are known in the prior art. Prior art valve assemblies are used in a variety of environments generally to perform the function of controlling the flow of a gas, liquid or a solid through a conduit. U.S. Pat. Nos. 3,291,443 to Schulz et al. and 3,640,499 to Jung disclose valve mechanisms wherein a rotatable valve member is disposed within a flexible walled conduit. In Schulz et al., the flexible conduit forms a portion of the overall flow conduit. In Jung, the flexible walled conduit is formed as an insert within an overall flow conduit. Neither Schulz et al. nor Jung are designed as discharge valve assemblies for use in dust or particulate material collection systems. Also, the valve members are pivotable about axes passing through the valve members and through a line bisecting each respective valve member. When such pivot axes are used, the stretching or distortion of the flexible conduit during the opening and closing of the valve member is minimized.

An article by Michael Hussey entitled "Valves and Air Locks for Industrial Dust Filter Systems" in the September/October, 1976 issue of *Filtration and Separation* provides a summary of various types of valve assemblies used in dust filtration systems. As disclosed within the Hussey article, numerous type of valve assemblies are used in dust filtration systems. Such valve assemblies include slide valves, diverter valves, pinch valves, single and double flap valves, flexible blade rotary valves and floating seal rotary valves.

Multiple-stage dust collectors and in particular multiple-stage dust collectors for use in mine drilling operations are known in the prior art. In modern underground mining operations the method of supporting the mine roof by beams extending from floor to roof has been replaced by a method in which the roof is bolted to strata above the roof. Holes are drilled through the roof and into the supporting strata. Bolts are then utilized to secure the roof to the supporting strata. Large quantities of dust are generated in the roof drilling operation. It is desirable to move the generated dust from the roof drill operator environment. In addition to improving the operator environment, dust removal increases roof drill performance.

The prior art includes a number of multiple-stage roof drill dust collectors developed by the assignee of the present invention. One such multiple-stage collector is described in "Operation Manual for Donaldson Roof Drill Dust Collector RDXOO-4545" printed by the Donaldson Company, Inc. in 1975. Another multiple-stage dust collector is disclosed in U.S. patent application Ser. No. 805,986, now U.S. Pat. No. 4,144,043 assigned to the assignee of the present application. The dust collectors described in the above publication and application include first stage cyclone separators, second stage separators, and third stage filters. One of the second stage separators includes reverse-flow cyclone separator tubes, while the other second stage separator includes a side outlet separator.

In the above-described prior art dust collectors, the roof drilling operations must be periodically stopped while the collected dust is removed from chambers within the multiple-stage dust collectors. Dust collection chambers are located below at least the first and second stages of such a multiple-stage dust collector. The dust collection chambers must be manually cleaned periodically. So that the mine drilling operation can be carried out efficiently without the need of frequently cleaning the dust collection chambers, the dust collection chambers have been made of a relatively large capacity, for example 1.3 to 2.4 cubic feet. The requirement of a large collection capacity within the dust collection chambers increases the overall size of a dust collector. However, to increase size of the dust collectors, while at the same time maintaining dust collection efficiency, is not cost effective. Furthermore, the maximum size of a multiple-stage dust collector housing is limited by the fact that it must be conveniently mounted on the roof-drill vehicle and the more compact a roof-drill vehicle can be made increases the versatility of such a vehicle within mining operations.

BRIEF SUMMARY OF THE INVENTION

A discharge valve assembly for use in a particulate material separator system is disclosed. The discharge valve assembly is comprised of a conduit, a rotatable valve member, and a rod connected to the valve member. The conduit is formed of an elastic material and has a generally circular cross-section. The conduit also has an inner diameter in an unstretched condition and an inlet and an outlet end. The rotatable valve member is disposed in the conduit between the inlet and outlet ends. The valve member has a generally circular cross-section and an outer diameter greater than the inner diameter of the conduit in an unstretched condition. The rod has an axis spaced from a line bisecting the valve member and is connected to the valve member for rotating the valve member between a closed position and an open position.

In a preferred embodiment of the invention, the axis is spaced from a major face of the valve member, and a bracket means is attached to the major face of the valve member and the rod connected to the bracket means. The bracket means includes a pair of arms extending from the major face. Each of the arms has a hole through it for receiving the rod. The rod is coupled to the holes for rotary motion therewith and extends out of the conduits through apertures therethrough. The holes through the arms and the apertures through the conduit are aligned so that the rod is supported both spaced from and generally parallel to a line bisecting the valve member.

In one embodiment of the invention, a dust separator and discharge valve assembly is comprised of means for separating dust from dust-laden air and collection means for collecting dust separated by the separating means. The collection means includes at least one conduit having an open inlet and an open outlet end, and a rotatable valve member disposed within the conduit between the inlet and outlet ends. The conduit is formed of an elastic material and has a generally circular cross-section and an inner diameter in an unstretched condition. The rotatable valve member has a generally circular cross-section and an outer diameter greater than the inner diameter of the conduit in an unstretched condition. A means is provided for rotating the valve member about an axis spaced from a line bisecting the valve member between a closed and an open position.

In another embodiment of the invention, a multiple-stage dust collector is comprised of a housing and a dust separating means carried by the housing. The dust separating means includes first, second and third dust separator mechanisms. A first conduit is supported in the housing and in fluid communication with a dust outlet from the first dust separator mechanism. The first conduit is formed of an elastic material and has a generally circular cross-section and a first diameter in an unstretched condition. A first rotatable valve member is disposed in the first conduit at a location between an inlet and an outlet end of the first conduit. A second conduit is supported in the housing and is in communication with a second dust outlet from the second separator mechanism. The second conduit is formed of an elastic material and has a generally circular cross-section and a second inner diameter in an unstretched condition. A second rotatable valve member is disposed in the second conduit at a location between a second open inlet and outlet end. The second rotatable valve member has a generally circular cross-section and a second outer diameter greater than the second inner diameter of the second conduit. Means are provided for rotating the first and second valve members between closed and open positions within their respective conduits. The first and second conduits thus serve as dust collection chambers for the first and second separator mechanisms and also as discharge valve assemblies.

In the closed position, the rotatable valve member of the discharge valve assembly stretches the conduit around its entire circumference. Since the axis of rotation of the valve member is spaced from a line bisecting the valve member, rotation of the valve member from its closed position to its open position and vice versa stretches portions of the elastic conduit even more than the conduit is stretched in the closed position. When the discharge valve assembly is used as a collection chamber for dust particles, some particles have a tendency to stick or adhere to the inner walls of the conduit. The stretching of the walls of the conduit during the rotation of the valve member tends to break up any dust or particles that may have adhered to the walls. Also, since the rotation axis is below the area where the valve member forms a seal with the conduit, sealing members are not required about the apertures through which the rod passes in the conduit. This simplifies the construction over the flexible wall valve mechanisms shown in Schulz et al and Jung patents.

When the discharge valve assemblies are used in multiple-stage dust collectors which are used in conjunction with mine drilling apparatus, the dust discharging operation can be performed frequently and the overall size of the multiple-stage dust collector can be kept small. The discharge valve assembly can be operated so that the valve members move to an open position whenever a drill bit is withdrawn from a hole which is being drilled. The drill bits used in mine roof drilling operations generally have a maximum length, for example, 3 feet. If holes greater than the maximum length of a drill bit are required, the drill bit must be withdrawn from the hole and an extension must be placed on the drill bit. Thus during a single drilling operation, a drill bit may be withdrawn a number of times. With each withdrawal of the drill bit, the valve members are moved to an open position and discharge the dust collected therein. The size of the collection chambers formed within the conduits can thus be kept relatively small and the overall size of the dust collector can likewise be kept relatively small.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described several embodiments of the invention.

BRIEF DESCRIPTION OF THE DRAWINGS

FIG. 3 is a sectional view taken along line 3—3 of FIG. 2;

FIG. 4 is a front elevational view of a multiple-stage dust collector of the present invention;

FIG. 6 is a bottom plan view of a discharge valve assembly in accordance with the present invention illustrating a valve member in an open position;

FIG. 7 is a view taken along line 7—7 of FIG. 6;

FIG. 10 is a view similar to FIGS. 9 and 7 illustrating the valve member in an intermediate position between its open and closed position; and FIG. 11 is an enlarged sectional view of a portion of a valve member.

DETAILED DESCRIPTION OF THE INVENTION

Figure 1:
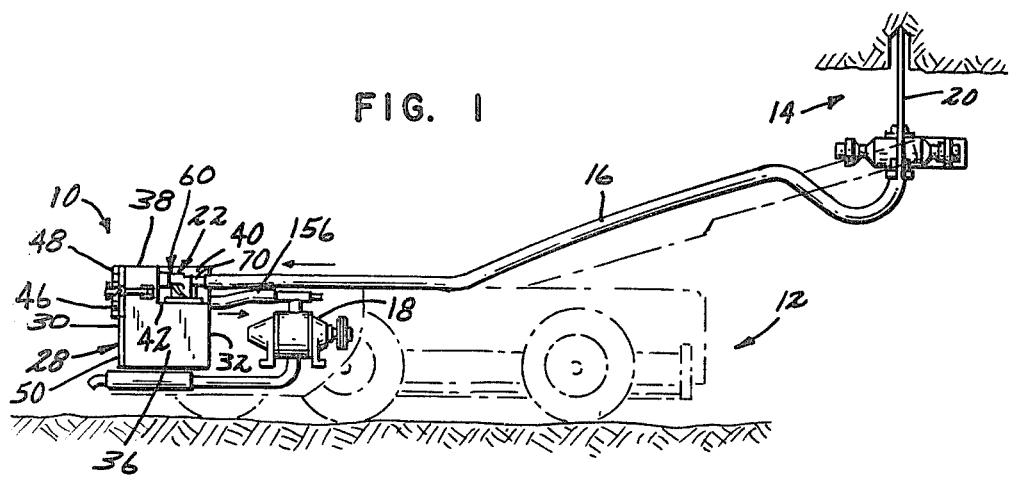
FIG. 1 is an elevational view illustrating a multiple-stage dust collector for the present invention mounted on a roof drill mechanism.

Referring to the drawings in detail wherein like numerals indicate like elements, there is shown in FIG. 1 a multiple-stage dust collector 10 mounted on a roof drill vehicle 12. A roof drill 14 is connected by a vacuum intake hose 16 to the multiple-stage dust collector 10. A vacuum blower 18 is connected to the multiple-stage dust collector 10 to pull dust-laden air therethrough from the drill 14. The drill 14 is provided with a hollow drill bit 20 having an aperture therein, (not shown) which collects the dust during the drilling and channels the dust-laden air to the vacuum intake hose 16. The drill bit 20 is rotatably driven and is forced upward against a mine roof by pneumatic means (not shown).

Figure 2:
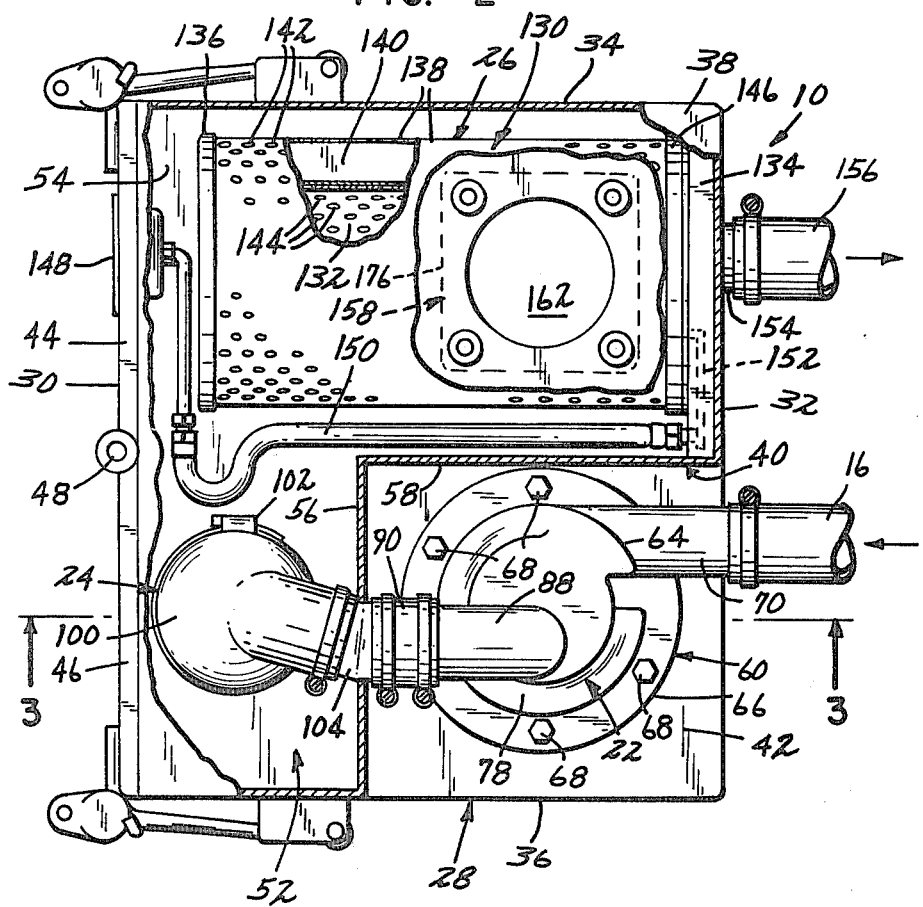
FIG. 2 is a top plan view, partially broken away, of a multiple-stage dust collector of the present invention.

The multiple-stage dust collector 10 includes a first stage dust collector 22, a second stage dust collector 24 and a third stage dust collector 26. The dust collectors 22, 24 and 26 are illustrated in more detail in FIGS. 2 and 3. The dust collectors 22, 24 and 26 are supported in housing 28. The housing 28 includes a front wall 30, a back wall 32, a pair of side walls 34, 36 and a top wall 38. In one corner of the housing 28 a cut-out portion or open area 40 is formed in the walls 32, 36, and 38. The cut-out portion 40 has a base 42 for supporting the first stage dust collector 22.

An upper portion of the front wall 30 is made up of a pair of doors 44, 46 pivotably mounted to a hinge 48. The hinge 48 is attached to the housing 28 and a pair of latch mechanisms 49 releasably hold the doors 44, 46 in their closed positions. A gasket 51 may be provided to help form an airtight seal around the doors 44, 46. See FIG. 4. The lower portion of the front wall 30 is formed of a skirt member 50. An expansion chamber 52 is formed in the housing 28. The expansion chamber 52 is bounded by doors 44, 46, portions of walls 32, 34, 36, top wall 38, a base plate 54, and a pair of upright partitions 56, 58.

The first stage dust collector 22 includes a cyclone separator 60 as a first dust separator mechanism. The cyclone separator 60 is mounted to the base 42 about an aperture 62 formed therethrough. The cyclone separator 60 has an essentially cylindrical housing 64 with an outwardly extending flange 66. A plurality of fasteners 68 are provided to secure the flange 66 to the base 42 about the aperture 62. The cyclone separator 60 has a tangential inlet conduit 70 to which is attached the vacuum intake hose 16. A tubular portion 72 divides the cylindrical housing 64 into an air outlet chamber 74 and an air inlet chamber 76. The cylindrical housing 64 has a helical ramp portion 78 which extends approximately 270 degrees about the cylindrical housing 64. The helical ramp portion 78 defines a helical flow path for dust-laden air entering the air inlet chamber 76. The heavier dust particles will be centrifugally thrown against an inner surface 80 of the cylndrical housing 64 whereby the heavier dust particles, indicated generally as 82, will fall downwardly into a first dust collection means indicated generally as 84. The structure and operation of the dust collection means 84 will be explained more fully hereinafter. As indicated by arrows 86, the substantially clean air reverses its flow to enter the air outlet chamber 74. Extending from the air outlet chamber 74 is an air outlet conduit 88 to which is secured a short piece of flexible hose 90.

The second stage dust collector 24 includes a second dust separator mechanism 92 mounted to the base plate 54 within the expansion chamber 52. The second dust separator mechanism 92 is a side outlet type of dust separator formed as a cylindrical member of a substantially rigid material, for example, polyurethane. The substantially rigid material preferably has high abrasion resistant characteristics to resist wear from dust impacting. The dust separator mechanism 92 has an air inlet end 94, a dust outlet end 96, and a continuous side wall or outer body 98. An air inlet dome 100 is fitted above the air inlet end 94 and is secured to the side wall 98 by a fastening means 102. Fastening means 102 can be any conventional fastener which secures the dome 100 to the side wall 98 in an airtight manner. A conduit 104 couples the flexible hose 90 to the air inlet dome 100. As indicated by arrows 106 and 108, fluid communication is thus established between the air outlet chamber 74 of the cyclone separator 60 and the air inlet end 94 of the second dust separator mechanism 92.

The dust separator mechanism 92 has a pair of axial passageways 110, 112 divided by a central section 114 which is formed integral with the continuous side wall 98. Each of the axial passageways 110, 112 has an axis which is aligned parallel to the central axis of the cylindrical dust separator mechanism 92. The passageways 110, 112 are spaced 180 degrees apart about the central axis of the dust separator mechanism 92. It will be understood that more than two such axial passageways could be formed in the dust separator mechanism 92. Each axial passageway has a cylindrical-shaped portion proximate the inlet end 94 and a frusto-conical portion proximate the outlet end 96. A pair of vortex generating devices 116 and 118 are positioned within the axial passageways 110, 112 proximate the inlet end 94. The vortex generating devices 116 and 118 preferably include a plurality of helical vanes 120 affixed to an elongated hub member 122. The vortex generating devices 116, 118 are preferably press-fitted within the axial passageways 110, 112. A pair of outlet conduit members 124, 126 are received within apertures 125 through the side wall 98. The conduit members 124, 126 have inlet ends which are positioned generally along the axis of the axial passageways 110, 112 and spaced apart from the vortex generating devices 116, 118. The air outlet conduit members 124, 126 define air discharge passageways or air outlets between the axial passageways 110, 112 and the expansion chamber 52. For additional details of the second dust separator mechanism 92, reference is made to copending application Ser. No. 805,986, which is incorporated herein by reference.

A second dust collection means, designated generally as 128, is supported below and communicates with the discharge end 96 for receiving dust particles separated by the dust separator mechanism 92 and passing downwardly out of the axial passageways 110, 112. While the dust separated by the separator mechanism 92 passes into the collection means 128, air exits the separator mechanism 92 via the conduit members 124, 126. Details of the second dust collection means 128 will be explained more fully hereinafter.

The third stage dust collector 26 includes a filter element 130 mounted within the expansion chamber 52. The filter element 130 has an inner tubular wall 132 which defines an axial passageway communicating with a clean air outlet from the collector 10. The clean air outlet includes an aperture (not shown) through the back wall 32 and an aperture (not shown) through a mounting block 134 attached to an inner surface of the back wall 32. The axial passage-way is closed at one end thereof by a base member 136. The filter element 130 also has an outer cylindrical wall 138 concentric with the inner wall 132. An annular heavy-duty pleated paper cartridge filter element 140 is carried between the walls 132, 138. Apertures 142 are formed in the outer wall 138 and apertures 144 are formed in the inner wall 132. A second base member 146 is affixed to the other end of the filter element 130 and abuts the mounting block 134. A bracket mechanism (not shown) mounts the filter element 130 to the mounting block 134. The base members 136, 146 are affixed in an airtight manner to the filter element 130 and the filter element 130 is affixed in an airtight manner to the mounting block 134. Fluid communication is thus provided between the expansion chamber 52, the apertured wall 138, the paper filter element 140, and the clean air outlet, since air flowing from the outlet conduit members 124, 126 and through the expansion chamber 52 is constrained to move through the walls 138, 132 and the paper filter 140.

An indicating device 148 is mounted to the front wall 30. A tubular connection means 150 connects the pressure indicating device 148 with a bore 152 through the mounting block 134. The bore 152 communicates with and is adjacent to the clean air outlet. The indicating device 148 provides an indication of the restriction caused by dust collecting in the paper filter element 140. When the indication reaches a certain predetermined value, the filter element may be removed and cleaned. Indicating device 148 and its operation is described in greater detail on page 15 of the Donaldson Company Operation Manual referred to above. A pipe or tube 154 extends outwardly from the rear wall 132 and is in fluid communication with the clean air outlet. A flexible tube 156 is connected at one of its ends to the tube 154 and at its other end to the vacuum blower 18. The vacuum blower 18 thus provides a suction force on the first, second and third separator mechanisms.

A vacuum breaking or bleeding means, indicated generally at 158, is attached below the expansion chamber 52. See FIGS. 2 and 4. The vacuum breaking means 158 opens the expansion chamber 52 to the surrounding atmosphere in order to remove the suction force from the first and second dust collection means 22,24 when the collection means 22,24 are in their dumping modes. The operation of the vacuum breaking means 158 will be explained more fully hereinafter.

The first duct collection means 84, the second duct collection means 128 and the vacuum breaking means 158 each have essentially the same construction except for their size and mounting flanges. Hence, only the first collection means 84, which is shown in detail in FIGS. 6-10, will be described in detail with similar parts indicated by similar numerals.

The dust collection means 84 also forms the discharge valve assembly in accordance with the present invention. The dust collection means 84 is comprised of a conduit 160 and a rotatable valvbe member 162. The conduit 160 is formed of an elastic material, preferably a synthetic elastomeric material. In the preferred embodiment, the conduit 160 of the first dust collection means 84 has an inner diameter of approximately 8 inches in an unstretched condition. The inner diameter in an unstretched condition is shown by arrow 164 adjacent a top or inlet end 166 of the conduit 160. The conduit 160 has a generally circular cross section in an unstretched condition, and in the first dust collection means 84 is held in a generally circular configuration and unstretched condition adjacent its inlet end 166 by an annular flange 168. The annular flange 168 is affixed within a ledge 170 formed in an inner wall 172 of the conduit 160 adjacent its inlet end 166. In the preferred embodiment, the conduit 160 of the second dust collection means 128 and the vacuum breaking means 158 have inner diameters of approximately 4 inches and are held in a generally circular configuration in an unstretched condition at their inlet ends 166 by flanges 174,176 that fit around the outer diameter of the respective conduits 160. The conduits 160 are secured to the flanges 168,174 in a conventional manner. The thickness of the 8 inch conduit 160 is preferably ½ and the thickness of the 4 inch conduit is preferably ⅜ inch. It has been found that elastomeric materials having a durometer hardness of approximately 30 to 70 are suitable for use within discharge valve assemblies. The material of which the conduits 160 are made should be sufficiently strong to serve as a collection chamber and to stand up to numerous openings and closings of the valve member 162. The material, however, must be sufficiently flexible to permit the valve member 162 to move between its open and closed positions. Materials beyond the 30 to 70 durometer hardness range may also prove suitable.

The conduit 160 of the first collector means 84 is fastened to the base 42 by means of the fasteners 68, such as screws or bolts attaching to the flange 168. Fasteners 214 secure the flanges 174,176 to the bottom surface of the base plate 54 to thereby secure the conduits 160 of the second dust collector means 128 and the vacuum breaking means 158 in position.

Figure 5:
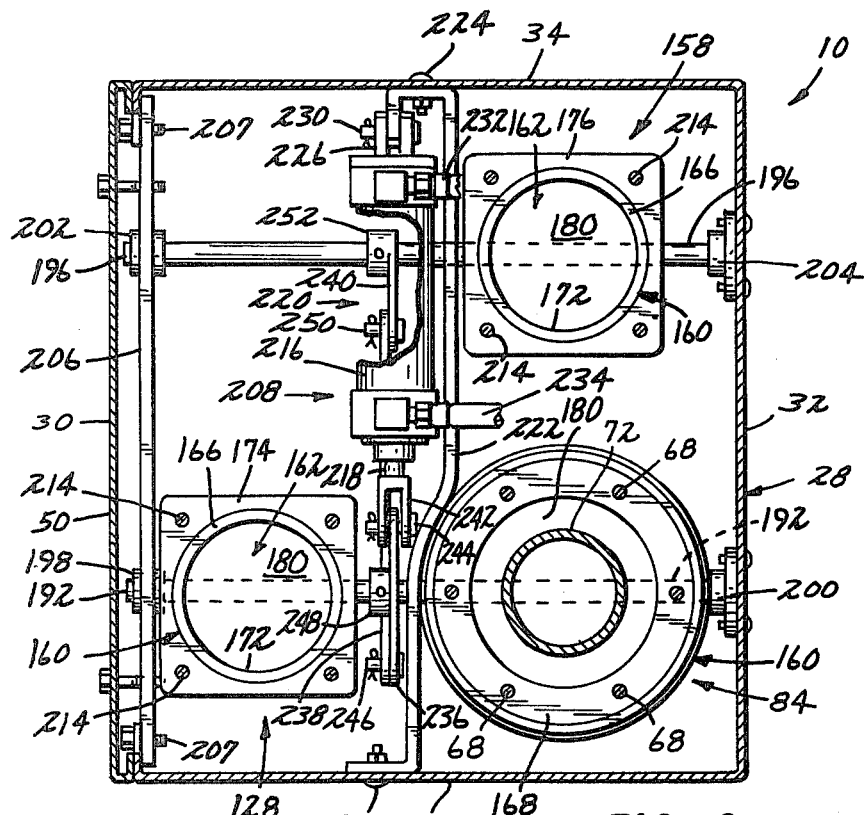
FIG. 5 is a sectional view taken generally along lines 5—5 of FIG. 3.
Figure 8:
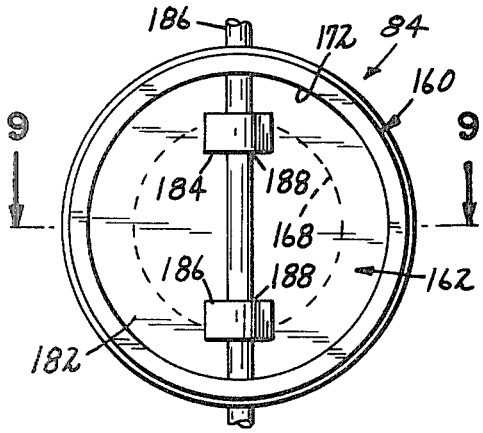
FIG. 8 is a bottom plan view of the discharge valve assembly shown in FIG. 6 illustrating the valve member in a closed position.
Figure 9:
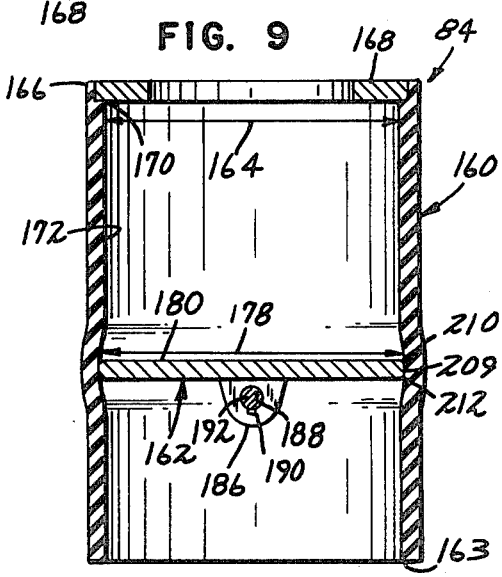
FIG. 9 is a view taken along line 9—9 of FIG. 8.

The valve member 162 has an outer diameter, indicated by arrow 178, which is slightly greater than the inner diameter 164, for example, by approximately ¼ inch. The valve member 162 has an upper major face or surface 180, which in a closed position of the valve member faces upwardly toward the inlet end 166 of the conduit 160. In the closed position, the valve member 162 is disposed generally perpendicular to the longitudinal axis of the conduit 160 and supports dust particles that have been separated by the mechanism 60 upon the upper surface 180. the valve member 162 also has a lower major face or surface 182 which faces an open outlet end 163 in the closed position. A bracket means including at least two arms 184,186 are attached to the lower surface 182. Each arm 184,186 has a hole 188 and a key slot 190 extending through it. A rod 192 passes through each of the holes 188 in the arms 184,186. The rod 192 has a plurality of keys 194 which matingly fit within the key slots 190. For the purposes of rotary motion, the rod 192 is thus fixed relative to the arms 184,186 and the valve members 162. The conduits 160 of the first and second dust collection means 84,128 each have holes or apertures 195. The holes 195 are aligned with the holes 188. As seen in FIG. 5, the rod 192 is a single integral rod that passes through holes 188 and 195 associated with both the first and second dust collection means 84,128. Valve members 162 of the first and second dust collection means 84,128 can thus be rotated simultaneously. A second rotatable rod 196, which has a similar key, fits within holes and key slots of the arms 184,186 attached to the valve member 162 of the vacuum breaking means 158.

The rod 192 is rotatably supported in bearing means or blocks 198 and 200. The rod 196 is rotatably carried in bearing means or blocks 202 and 204. The bearing blocks 198,202 are attached to a front brace member 206 and the bearing blocks 200,204 are attached to the back wall 32. The front brace 206 is attached to flanges extending from the side walls 34,36 and to the skirt 50 by suitable fastening means such as bolts 207. Motor means 208 is provided for rotating the rods 192,196. The operation of the motor means 208 will be explained more fully hereinafter.

The valve member 162 is preferably made of noncorrosive stainless steel. As best seen in FIG. 11, the valve member 162 has an outer flat edged circumference or perimeter 209 which connects to the upper and lower surfaces 180,182 through a pair of small curved sections 210,212. The valve member 162 is rotatable between an open position shown in FIGS. 6 and 7 and a closed position shown in FIGS. 8 and 9. An intermediate position between the open and closed positions is shown in FIG. 10. Since the diameter 178 of the valve member 162 is slightly greater than the diameter 164 of the conduit 160, even in an open position, the valve member 162 forces free portions of the conduit 160 into a distorted condition. See FIG. 6. In the closed position, the circumferential flat edge 209 forms a broad firm seal about the entire inner circumference of the conduit 160. The conduit 160 is stretched locally around the entire circumference of the valve member 162. See FIG. 9. The curved portions 210,212 serve to protect the inner wall 172 of the conduit 160 during the rotation of the valve member 162 between its open and closed positions.

As is seen in FIG. 10, during the rotation of the valve member 162 from a closed to an open position, the conduit 160 is stretched or pulled. The stretching or pulling of the conduit 160 breaks up or dislodges any dust or particulate material that may have collected on the inner wall 172 of the conduit 160. This is especially desirable in dust collection apparatus, since fine particulate material tends to adhere to the walls of a collection chamber. The stretching or distortion of the wall 172 is caused or exaggerated by the placement of the axis of the rod 192. The axis of the rod 192 is displaced a distance away from the lower surface 182 and, hence, from a line which would bisect the valve member 162 by passing therethrough. This displacement of the rotational axis away from a line bisecting the valve member 162 causes a portion of the perimeter edge 209 to force a distortion of the conduit 160 during rotation between the closed and open positions and vice versa. This distortion of the conduit 160 is larger than if the axis were disposed along a line bisecting the rotatable valve member 162. The placement of the rotational axis below the valve member 162 also has the advantage of simplifying the structure of the conduit 160 about the holes 195. Since the rotational axis and the holes 195 are disposed below the seal formed between the valve member 162 and the wall 172 of the conduit 160, no sealing means are required about the holes 195.

The motor means 208 includes a cylinder 216, a pneumatically driven piston rod 218, and a linkage means 220 coupling the piston rod 218 to the rotatable rods 192, 196. A central crossbar or brace 222 extends generally horizontally along the middle of the housing between the side walls 34,36 and is attached at either of its ends to the side walls 34,36 by suitable fasteners, such as nuts and bolts 224. A yoke 226 extends from one end of the cylinder 216 and is pivotably attached to a flange 228 of the crossbar 222 by means of a bolt and cotter pin 230. A pneumatic fluid line 232 is connected to one end of the cylinder tube 216 and a pneumatic fluid line 234 is connected to the other end of the pneumatic cylinder 216. The pneumatic lines 232,234 supply pneumatic fluid to the cylinder 216 in order to extend and retract the piston rod 218 in a conventional manner.

The linkage means 220 includes a first drive arm 236, a linkage arm 238 and a second drive arm 240. A yoke 242 is fixedly secured to the distal end of the piston rod 218. An upper end of the first drive arm 236 is pivotably coupled to the yoke 242 by a bolt and cotter pin 244. The other lower end of the first drive arm 236 is pivotably connected to one end of the linkage arm 238 by a bolt and cotter pin 246. The central section of the first drive arm 236 is fixedly secured to the rod 192 by a block 248. The other end of the linkage arm 238 is pivotably connected to one end of the second drive arm 240 by a bolt and cotter pin 250. The other end of the second drive arm 240 is fixedly secured to the rotatable rod 196 by a block 252. By means of the linkage means 220, reciprocatory motion of the piston rod 218 is converted into a simultaneous rotary motion of the rod 192 and the rod 196. In this manner, all of the valve members 162 may be simultaneously moved between their open and closed positions.

In the embodiment wherein the dust collector 10 is utilized with a mine roof drill, the pneumatic fluid which is supplied through the lines 232,234 can be from the pneumatic fluid source used to pneumatically extend the drill chuck against the roof and to retract it therefrom. The pneumatic fluid can be supplied to the lines 232,234 by means of a manual switching mechanism or can be supplied thereto by an automatic switching mechanism. An automatic switching mechanism can be designed so that the piston rod 218 is in a completely extended or retracted position and all of the valve members 162 are in an open disposition whenever the drill chuck is withdrawn from the roof of a mine, and so that the piston rod 218 is in its opposite position to close the valve members 162 whenever the drill chuck is moved toward a mine roof. The vacuum breaking means 158 is thus sealed and the dust collection means 84,128 are closed whenever the drill is moved into an operative position and are moved to an open position whenever the drill bit is retracted. The vacuum breaking means 158 provides a bleed-off to atmosphere for any suction from the vacuum blower 18 when the dust collection means 84,128 are in their dumping positions.

The operation of the present invention should be evident from the above description and, hence, will only be summarized hereinafter. In the embodiment of the present invention used with a mine roof drill, dust generated by the roof drill 14 is collected by the hollow drill bit 20 and directed through a vacuum intake hose 16 to the inlet conduit 70 of the first separator mechanism, cyclone separator 22. Dust-laden air enters the inlet chamber 76. The helical end portion 78 imparts a helical flow component to the dust-laden air whereby the heavier dust particles are centrifugally thrown against the inner surface 80 and deposited in the first dust collection chamber 84. The valve member 162 of the first and second dust collection chambers 84,128 and the vacuum breaking means 158 are all in their closed positions during the drilling operation. The substantially clean air enters the air outlet chamber 74 and is fed through the outlet conduit 88 and the flexible hose 90 to the air inlet dome 100 of the second dust separator mechanism 92. The first dust collector 22 removes approximately 95 percent or more of the dust entrapped in the air entering inlet chamber 76.

The air travels through the inlet dome 100 into the axial passageways 110,112 where a vortex is generated in the flow by the helical vanes 120. The operation of the dust separator mechanism 92 will be described with reference to the axial passageway 110, it being understood that the operation of the axial passageway 112 is identical. With the vortex flow generated within the axial passageway 110, dust particles are centrifugally thrown against the inner side wall of the axial passageway 110 and are discharged through the frusto-conical lower portion into the second dust collection means 128. Clean air is collected by the air outlet conduit member 124 and is discharged into the expansion chamber 52.

Air entering the expansion chamber 52 will be drawn into and through the filter element 130 passing through the annular paper filter element 140, into the axial passageway and finally out the clean air outlet to the vacuum blower. The clean air may be then discharged into the atmosphere through the vacuum blower 18.

Once an individual drilling operation has been completed or is interrupted by withdrawing the drill bit 20 from the roof mine, all the valve members are moved to their open positions. This is accomplished by supplying pneumatic fluid to one of the lines 232,234 in order to move the piston rod 218 to another end position. The valve members 162 remain in an open position until the next drilling operation is to be performed. When the drill bit 20 is moved upwardly to the roof of a mine, pneumatic fluid is again supplied through one of the lines 232,234 to move the piston rod 218 to another position and to thereby close all the valve members 162.

Numerous characteristics and advantages of my invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

I claim:

1. A dust separator and discharge valve assembly comprising:
   means for separating dust from dust-laden air, including a dust-laden air inlet and a clean air outlet;
   collection means for collecting dust separated by said separating means from said dust-laden air, said collection means being attached to and in communication with said separating means;
   said collection means including at least one conduit, said at least one conduit having an open inlet end, an open outlet end, and a rotatable valve member disposed within the at least one conduit between said inlet and outlet ends;
   said at least one conduit being formed of an elastic material having a generally circular cross section and an inner diameter in an unstretched condition;
   said rotatable valve member having a generally circular cross section and an outer diameter greater than said inner diameter; and
   means for rotating said valve member about an axis spaced from a line bisecting said valve member between a closed position wherein said valve member is substantially perpendicular to a longitudinal axis of said at least one conduit and dust can collect within said at least one conduit above said valve member and an open position wherein said valve member is not perpendicular with the longitudinal axis of said at least one conduit and dust is free to fall downwardly past said valve member through said open outlet end.

2. A dust separator and discharge valve assembly in accordance with claim 1 including a housing for supporting said separating means and said collection means and wherein said separating means includes a first dust separator mechanism having a first air inlet, a first air outlet, a first separator device for separating dust particles from dust-laden air and a first dust outlet, said first air inlet being in fluid communication with said dust-laden air inlet and said first air outlet being in fluid communication with said clean air outlet, said at least one conduit being supported below said first dust outlet to receive dust falling downwardly therefrom through said open inlet end, said valve member in its closed position having an upper major face facing said first separator mechanism for supporting dust received in said at least one conduit from said first separator mechanism and a lower major face facing said outlet end of said at least one conduit.

3. A dust separator and discharge valve assembly in accordance with claim 2 wherein said rotating means includes at least one arm extending from said lower major face of said valve member and a rotatable rod coupled to said at least one arm at a location spaced from said lower major face for rotary motion therewith, said rod extending outwardly of said at least one conduit through apertures through said at least one conduit at locations spaced 180 degrees apart along the circumference of said at least one conduit, and a pair of bearing means connected to said housing for rotatably supporting opposite ends of said rod.

4. A dust separator and discharge valve assembly in accordance with claim 3 wherein said rotating means includes motor means coupled to said rod for rotating said rod between the open and closed position of said valve member.

5. A dust separator and discharge valve assembly in accordance with claim 4 wherein said motor means includes a cylinder, a pneumatically actuated piston rod carried thereby and linkage means coupling said piston rod to said rotatable rod for converting linear motion of said piston rod to rotary motion of said rotatable rod.

6. A dust separator and discharge valve assembly in accordance with claim 3 or 5 wherein said separating means includes at least a second dust separator mechanism supported by said housing, said at least one second dust separator mechanism having a second air inlet connected in fluid communication to said first air outlet, a second air outlet, a second separator device for separating dust particles from dust-laden air, and a second dust outlet, said collection means including a second conduit and a second rotatable valve member disposed within said second conduit, said second conduit being formed of an elastic material having a generally circular cross section and an inner diameter in an unstretched condition, said second rotatable valve member having a generally circular cross section and an outer diameter greater than the inner diameter of said second conduit, and means for rotating said second valve member about an axis spaced from a line bisecting said second valve member between a closed position wherein said second valve member is substantially perpendicular to the longitudinal axis of said second conduit and dust separated by said second separator mechanism can collect within said second conduit above said second valve member and an open position wherein said second valve member is not perpendicular to the longitudinal axis of said second conduit and dust is free to fall downwardly past said second valve member.

7. A dust separator and discharge valve assembly in accordance with claim 11 wherein said second conduit is supported below said second dust outlet to receive dust falling downwardly from said second separator mechanism, said second conduit having an open inlet end for receiving dust from said second separator mechanism and an open outlet end for discharging dust from said second conduit, said second valve member in its closed position having an upper major face facing said second separator mechanism for supporting dust received in said second conduit from said second separator mechanism and a lower major face facing said outlet end of said second conduit, said means for rotating said second valve member including at least one arm extending from the lower major face of said second valve member and a rotatable rod coupled to said last-mentioned at least one arm at a location spaced from said lower major face for rotation therewith, said last-mentioned rod extending outwardly of said second conduit through apertures through said second conduit at locations spaced 180 degrees apart along the circumference of said second conduit, and a pair of bearing means connected to said housing for rotatably supporting opposite ends of said last-mentioned rod.

8. A dust separator and discharge valve assembly in accordance with claim 7 wherein the rotatable rod of said means for rotating said first valve member is connected to the rotatable rod of said means for rotating said second valve member.

9. A dust separator and discharge valve assembly in accordance with claim 8 wherein the rotatable rod of said means for rotating the first valve member and the rotatable rod of said means for rotating said second valve member is a single integral rod.

10. A multiple-stage dust collector comprising:
a housing;
dust separating means supported in said housing, including first, second and third dust separator mechanisms;
said first dust separator mechanism for separating dust from dust-laden air including a first air inlet for receiving dust-laden air from a source, a first air outlet and a first dust outlet for discharging dust separated by said first dust separator mechanism;
said second dust separator mechanism for separating dust from dust-laden air including a second air inlet connected in fluid communication to said first air outlet, a second air outlet and a second dust outlet for discharging dust separated by said second dust separator mechanism;
said third dust separator mechanism for separating dust from dust-laden air being in fluid communication with said second air outlet and including a filtering means and a clean air outlet, said filtering means being disposed between said second air outlet and said clean air outlet for removing dust particles from the air passing therebetween;
a first conduit supported in said housing and in communication with said first dust outlet, said first conduit having a first open inlet end and a first open outlet end, said first conduit being formed of an elastic material having a generally circular cross section and a first inner diameter in an unstretched condition;
a first rotatable valve member disposed in said first conduit at a location between said first open inlet and outlet ends, said first rotatable valve member having a generally circular cross section and a first outer diameter greater than said first inner diameter;
a second conduit supported in said housing and in communication with said second dust outlet, said second conduit having a second open inlet end and a second open outlet end, said second conduit being formed of an elastic material having a generally circular cross section and a second inner diameter in an unstretched condition;
a second rotatable valve member disposed in said second conduit at a location between said second open inlet and outlet ends, said second rotatable valve member having a generally circular cross section and a second outer diameter greater than said second inner diameter;
means for rotating said first and second valve members between closed positions wherein each valve member stretches a respective conduit and forms a seal around a 360 degree circumferential extent to support dust separated by said first and second separator mechanisms and an open position wherein dust can pass each valve member and be discharged through said outlet ends.

11. A multiple-stage dust collector in accordance with claim 10 wherein each valve member has an upper surface for supporting dust in the closed position and a lower surface facing the discharge end of a respective conduit, and wherein said rotating means includes a single integral rod, means for attaching said integral rod to the lower surfaces of said valve members, said integral rod passing through apertures formed in each of said conduits, a motor means for rotating said rod and said valve members attached thereto, and linkage means connecting said motor means to said rod.

12. A multiple-stage dust collector in accordance with claim 11 wherein said attaching means includes at least two arms extending from each of said lower surfaces, each of said arms having a hole through it, said integral rod passing through each of said holes and being coupled to each of said holes for rotary motion therewith.

13. A multiple-stage dust collector in accordance with claim 10 or claim 12 including means for applying a suction force to said clean air outlet for drawing air through said first air inlet and thereafter through said first dust separator mechanism, said second dust separator mechanism, and said third dust separator mechanism.

14. A multiple-stage dust collector in accordance with claim 13 including a means for breaking said suction force when said rotatable valve members are moved to their open positions.

15. A multiple-stage dust collector in accordance with claim 14 wherein said housing includes an expansion chamber, said second and third dust separator mechanisms being supported in said expansion chamber, said second air outlet opening to said expansion chamber, the filtering means of said third dust separator mechanism including a hollow longitudinally extending filter element having a closed end and an open end, said open end being in fluid communication with said clean air outlet whereby air passing from said expansion chamber to said clean air outlet passes through said filter element.

16. A multiple-stage dust collector in accordance with claim 15 wherein said suction breaking means includes a third conduit supported below said expansion chamber, said third conduit having a third open inlet end and a third open outlet end, said third conduit being formed of an elastic material having a generally circular cross section and a third inner diameter in an unstretched condition, and a third rotatable valve member disposed in said third conduit at a location between said third open inlet and outlet ends, said third rotatable valve member having a generally circular cross section and a third outer diameter greater than said third inner diameter and being rotatable between an open and a closed position.

17. A multiple-stage dust collector in accordance with claim 16 wherein said third valve member has an upper surface facing said inlet end of said third conduit in the closed position and a lower face facing said outlet end of said third conduit, at least two arms extending from the lower face of said third valve member, each of said last-mentioned arms having a hole therethrough, a second rotatable rod passing through said last-mentioned holes and being coupled thereto for rotary motion therewith, said second rod passing through apertures in said third conduit, said linkage means being connected to said second rod whereby said motor means rotates said first and second rods simultaneously through said linkage means.

18. A multiple-stage dust collector in accordance with claim 17 wherein said motor means includes a cylinder supported in said housing, a piston rod movably carried by said cylinder and means for supplying fluid to said cylinder for moving said piston rod between an extended position and a retracted position, and wherein said linkage means includes a first drive arm pivotably coupled adjacent one of its ends to said piston rod and pivotably coupled adjacent its other end to a first end of a linkage arm, a second end of said linkage arm being pivotably connected to a first end of a second drive arm, said first drive arm being attached to said first integral rod for rotary motion therewith and a second end of said second drive arm being attached to said second rod for rotary motion therewith.

* * * * *

UNITED STATES PATENT AND TRADEMARK OFFICE
CERTIFICATE OF CORRECTION

PATENT NO. : 4,204,849
DATED : May 27, 1980
INVENTOR(S) : Gordon L. Johnston

It is certified that error appears in the above-identified patent and that said Letters Patent are hereby corrected as shown below:

Column 4, line 18, "for" should be --of--;

Column 7, line 20, "duct" should be --dust--;

Column 7, line 30, "valvbe" should be --valve--;

Column 7, line 53, after "1/2" the word --inch-- should be inserted;

Column 8, line 14, "the" should be --The--;

Column 12, line 46, "claim 11" should be --claim 6--.

Signed and Sealed this

Fourth Day of November 1980

[SEAL]

Attest:

SIDNEY A. DIAMOND

Attesting Officer

Commissioner of Patents and Trademarks